US012589522B2

(12) United States Patent
Lee et al.

(10) Patent No.: US 12,589,522 B2
(45) **Date of Patent: *Mar. 31, 2026**

(54) FLOOR CUTTING MACHINE

(71) Applicant: EGUN CO., LTD., Gwangju-si (KR)

(72) Inventors: Sung Jun Lee, Gwangju-si (KR); Chae Mun Lee, Seongnam-si (KR)

(73) Assignee: EGUN CO., LTD., Gwangju-si (KR)

( * ) Notice: Subject to any disclaimer, the term of this patent is extended or adjusted under 35 U.S.C. 154(b) by 442 days.

This patent is subject to a terminal disclaimer.

(21) Appl. No.: 17/779,521

(22) PCT Filed: Nov. 24, 2020

(86) PCT No.: PCT/KR2020/016642
§ 371 (c)(1),
(2) Date: May 24, 2022

(87) PCT Pub. No.: WO2021/107542
PCT Pub. Date: Jun. 3, 2021

(65) Prior Publication Data

US 2023/0021103 A1 Jan. 19, 2023

(30) Foreign Application Priority Data

Nov. 26, 2019 (KR) ........................ 10-2019-0153079
Jan. 20, 2020 (KR) ........................ 10-2020-0007147

(51) Int. Cl.
*B28D 1/24* (2006.01)
*E01C 23/09* (2006.01)
*B28D 7/02* (2006.01)

(52) U.S. Cl.
CPC ............ *B28D 1/24* (2013.01); *E01C 23/0933* (2013.01); *B28D 7/02* (2013.01); *E01C 2301/50* (2013.01)

(58) Field of Classification Search
CPC ......... B28D 1/24; B28D 7/02; E02C 23/0933; E02C 2301/50
See application file for complete search history.

(56) References Cited

U.S. PATENT DOCUMENTS 2,468,336 A * 4/1949 Hurst ..................... B28D 1/045 299/39.3
3,779,661 A * 12/1973 Godbersen ........... B62D 55/116 404/98

(Continued)

FOREIGN PATENT DOCUMENTS

CN 207901274 U 9/2018
CN 209211231 U 8/2019

(Continued)

*Primary Examiner* — Liang Dong
(74) *Attorney, Agent, or Firm* — Rabin & Berdo, P.C.

(57) ABSTRACT

A floor cutting machine according to the present invention can comprise: a main frame for supporting equipment required for cutting a floor; a plurality of front wheels positioned at the front of the main frame when the proceeding direction of the floor cutting machine is the front and the opposite direction thereof is the rear; at least one rear wheel positioned at the rear of the main frame; a cutting frame which is a frame separate from the main frame, and of which one side is fixed near the rear of the main frame and the other side vertically moves; a cutting shaft positioned near the other side of the cutting frame; and a cutting blade capable of being fitted into both ends of the cutting shaft.

7 Claims, 8 Drawing Sheets

(56) References Cited

U.S. PATENT DOCUMENTS

| | | | | | |
|---|---|---|---|---|---|
| 3,997,033 | A * | 12/1976 | Bulmer | F16D 65/18 | 192/93 R |
| 4,310,198 | A | 1/1982 | Destree | | |
| 4,998,775 | A * | 3/1991 | Hollifield | B23D 59/002 | 451/450 |
| 5,452,943 | A * | 9/1995 | Campbell | B28D 1/045 | 125/14 |
| 5,564,408 | A * | 10/1996 | Bassols | E01C 23/0933 | 451/344 |
| 6,145,499 | A * | 11/2000 | Tsuchishima | B28D 5/0076 | 125/35 |
| 9,096,977 | B2 | 8/2015 | Fritz et al. | | |
| 2003/0035687 | A1 * | 2/2003 | Gray | E01C 23/0993 | 404/94 |
| 2006/0060179 | A1 * | 3/2006 | Kingsley | E01C 23/0933 | 125/13.01 |
| 2006/0120215 | A1 * | 6/2006 | Sands | A47J 43/0727 | 366/205 |
| 2010/0147123 | A1 * | 6/2010 | Baumann | F16D 55/04 | 83/571 |
| 2012/0174905 | A1 | 7/2012 | Lee | | |
| 2012/0328370 | A1 * | 12/2012 | Gustafsson | E02F 5/101 | 405/157 |
| 2014/0079487 | A1 * | 3/2014 | Sjodahl | B23D 45/10 | 37/446 |

FOREIGN PATENT DOCUMENTS

| | | | | |
|---|---|---|---|---|
| DE | 1759522 | B1 | | 3/1972 |
| JP | S4716068 | Y1 | | 6/1972 |
| JP | H0316703 | A | | 1/1991 |
| JP | H06116910 | A | | 4/1994 |
| JP | H0672407 | B2 | | 9/1994 |
| JP | 2003184027 | A | | 7/2003 |
| KR | 20060028802 | A | | 4/2006 |
| KR | 20090001332 | U | | 2/2009 |
| KR | 10-0910647 | B1 | | 8/2009 |
| KR | 10-2011-0099945 | A | | 9/2011 |
| KR | 10-2015-0102663 | A | | 9/2015 |
| KR | 20150102663 | A | * | 9/2015 |
| KR | 10-1651425 | B1 | | 8/2016 |
| KR | 10-2018-0105521 | A | | 9/2018 |
| KR | 101974783 | B1 | | 5/2019 |

* cited by examiner

FLOOR CUTTING MACHINE

TECHNICAL FIELD

The present invention relates to a floor cutting machine configured to cut a floor, such as concrete.

BACKGROUND ART

Existing floor cutting machines are configured such that a cutting blade is attached to a main frame and the cutting blade is moved upwards and downwards according to movement of the main frame.

FIG. 1 is a view showing a conventional floor cutting machine.

Referring to FIG. 1, it can be seen that, when the position of a front wheel is adjusted, a main frame is moved upwards and downwards about a rear wheel as an axis. Also, it can be seen that a cutting blade attached to the main frame is also moved.

In the conventional (or existing) floor cutting machine, as described above, the cutting blade is attached to the main frame, and therefore, the cutting blade cannot be separately moved. That is, the main frame is also moved in order to adjust the cutting blade upwards and downwards. As a result, the main frame is inclined relative to a floor, as shown in FIG. 1. The conventional floor cutting machine has a problem in that, when the main frame is inclined relative to the floor, the entirety (or the body) of the conventional floor cutting machine is inclined, whereby it is difficult to fix a dust collection cover, and therefore mounting of the dust collection cover is impossible.

In addition, the conventional floor cutting machine has a problem in that, for a floor cutting machine configured such that power is provided from the rear wheel, when the main frame is inclined, the angle of the floor cutting machine is changed, and it is difficult to adjust the angle of the floor cutting machine.

In addition, the conventional floor cutting machine has a problem in that a worker lifts a handle provided at a rear part of the floor cutting machine to move the floor cutting machine; however, when the main frame is inclined, load is applied to the rear part of the floor cutting machine, and therefore it is not easy for the worker to move the floor cutting machine.

In addition, the conventional floor cutting machine has a problem in that direction change and cutting angle adjustment are difficult, whereby cutting performance is greatly deteriorated.

DISCLOSURE

Technical Problem

It is an object of the present invention to provide a floor cutting machine capable of solving problems with the conventional floor cutting machine described above.

Objects of the present invention devised to solve the problems are not limited to the aforementioned object, and other unmentioned objects will be clearly understood by those skilled in the art based on the following detailed description of the present invention.

Technical Solution

A floor cutting machine according to the present invention includes to accomplish the above object includes a main frame configured to support equipment necessary to cut a floor, a plurality of front wheels located at opposite sides of a front of the main frame on the assumption that an advancing direction of the floor cutting machine is a front and an opposite direction is a rear, at least one rear wheel located at a rear of the main frame, a cutting frame, which is a frame separate from the main frame, one side of the cutting frame being fixed to the vicinity of the rear of the main frame and the other side of the cutting frame being configured to be moved upwards and downwards, and a cutting blade fitted on opposite sides of a cutting shaft located in the vicinity of the other side of the cutting frame.

The one side of the cutting frame may be hinged to the vicinity of the rear of the main frame, and the floor cutting machine may further include a first hydraulic cylinder connected to the main frame and the cutting frame therebetween, the first hydraulic cylinder being configured to move the other side of the cutting frame upwards and downwards. The first hydraulic cylinder may be manipulated by a worker to move the other side of the cutting frame upwards and downwards and to move the cutting blade located in the vicinity of the other side of the cutting frame upwards and downwards.

The floor cutting machine may further include an auxiliary wheel located farther forwards than the at least one rear wheel, wherein, on the assumption that the auxiliary wheel is moved upwards and downwards by a second hydraulic cylinder located at an upper end thereof, when the auxiliary wheel is located above, the floor cutting machine may be supported on the floor through the plurality of front wheels and a plurality of rear wheels, whereby the floor cutting machine may be operated in a four-wheel-drive mode, and, when the auxiliary wheel is located below, the at least one rear wheel may not contact the floor, and the floor cutting machine may be supported on the floor through the plurality of front wheels and a plurality of auxiliary wheels, whereby the floor cutting machine may also be operated in a four-wheel-drive mode.

When the rear wheel is provided in one (three-wheel-drive), the floor cutting machine may further include a direction adjustment cylinder (hydraulic or electric cylinder) connected to the rear wheel, the direction adjustment cylinder being configured to adjust the rotation or direction of the rear wheel.

The floor cutting machine may further include a power motor configured to provide power to the floor cutting machine and a speed reducer connected to the power motor and the rear wheel therebetween, the speed reducer being configured to control a forward movement of the floor cutting machine.

The floor cutting machine may further include a power motor and a speed reducer located at an upper end of the cutting frame, wherein a shielding cover may be supported by a plurality of pillar frames connected to the main frame, and the shielding cover may be configured to protect the power motor and the speed reducer.

The section of each of the cutting blade may have a circular shape, and recesses configured to cut the floor may be provided in an outer circumference of the circular shape at regular intervals.

The floor cutting machine (four-wheeled or three-wheeled floor cutting machine) may further include a wireless controller configured to wirelessly control the power motor and the speed reducer.

Advantageous Effects

The present invention has an effect in that a cutting blade is attached to a cutting frame, which is separate from a main frame, whereby it is possible to move the cutting blade irrespective of the main frame.

The present invention has an effect in that an auxiliary wheel is included in addition to a front wheel and a rear wheel, whereby it is possible to easily adjust the direction of a cutting machine.

According to the present invention, a cutting blade is attached to a cutting frame, which is separate from a main frame, whereby it is possible to manufacture a three-wheeled floor cutting machine having one rear wheel and two front wheels, and therefore direction change and cutting speed adjustment are possible.

According to the present invention, a cutting blade is attached to a cutting frame, which is separate from a main frame, whereby it is possible to fix and mount a dust collection cover to a floor cutting machine.

According to the present invention, a dust collection cover is separately coupled to a floor cutting machine, whereby it is possible to remarkably improve dust collection and soundproof effects during cutting work.

Effects obtainable from the present invention are not limited by the above mentioned effects, and other unmentioned effects can be clearly understood from the following description by those having ordinary skill in the technical field to which the present invention pertains.

BEST MODE

Figure 1:
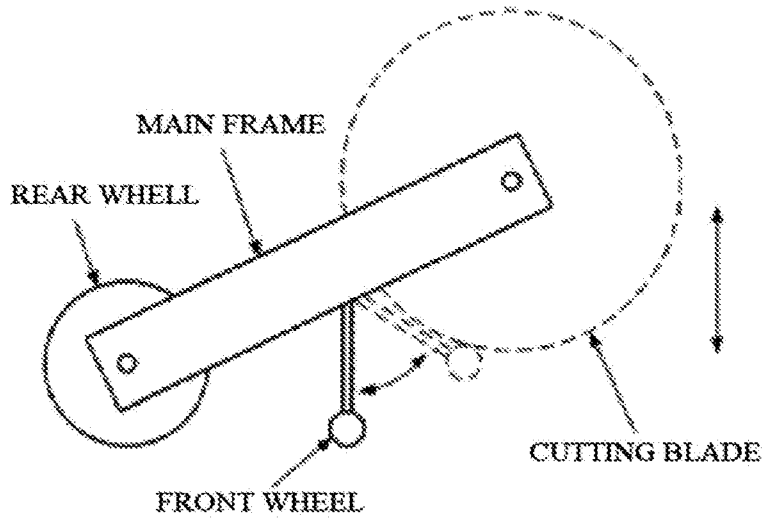
FIG. 1 (Prior Art)
FIG. 1 is a view showing a conventional floor cutting machine.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The following detailed description of the present invention will be given with reference to the accompanying drawings showing specific embodiments, based on which the present invention can be implemented, by way of example. These embodiments will be described in detail to such an extent that those skilled in the art can implement the present invention. It should be understood that various embodiments of the present invention are different from each other but do not have to be mutually exclusive. For example, specific shapes, structures, and features of one embodiment described herein can be implemented as another embodiment without departing the spirit and scope of the present invention. In addition, it should be understood that the position or disposition of individual elements in each disclosed embodiment can be changed without departing from the spirit and scope of the present invention. Consequently, the following detailed description is not restrictive, and the scope of the present invention is defined only by the appended claims and all equivalents thereto, if appropriately described. In the drawings, similar reference numerals denote the same or similar functions in several aspects.

In some cases, in order to avoid ambiguity in the concept of the present invention, known structures and devices may be omitted, or a core function of each structure and device may be shown as a block diagram. In addition, the same elements are denoted by the same reference numerals throughout this specification.

Hereinafter, preferred embodiments of the present invention will be described in detail with reference to the accompanying drawings such that those skilled in the art to which the present invention pertains can easily implement the present invention.

First, FIG. 1 is a view showing a conventional floor cutting machine, as previously described.

In the conventional floor cutting machine, a rear wheel is provided at one side of a main frame, a cutting blade is provided at the other side of the main frame, and the cutting blade is set to be moved simultaneously with movement of the main frame.

A front wheel attached to a lower end of the main frame may be adjusted to adjust operation (inclination) of the main frame. Specifically, upward-downward movement of the cutting blade may be adjusted about the rear wheel fixed to the main frame.

In the conventional floor cutting machine, therefore, the cutting blade is always moved together with the main frame. That is, in the conventional floor cutting machine, the main frame is also moved in order to adjust the cutting blade upwards and downwards. As a result, the main frame is inclined relative to a floor, as shown in FIG. 1. The conventional floor cutting machine has a problem in that, when the main frame is inclined relative to the floor, the entirety (or the body) of the conventional floor cutting machine is inclined, whereby it is difficult to fix a dust collection cover, and therefore mounting of the dust collection cover is impossible.

In addition, the conventional floor cutting machine has a problem in that, for a floor cutting machine configured such that power is provided to the rear wheel, when the main frame is inclined, the angle of the floor cutting machine is changed, and it is difficult to adjust the angle of the floor cutting machine. In addition, the conventional floor cutting machine has a problem in that a worker lifts a handle provided at a rear part of the floor cutting machine to move the floor cutting machine; however, when the main frame is inclined, load is applied to the rear part of the floor cutting machine, and therefore it is not easy for the worker to move the floor cutting machine. In addition, the conventional floor cutting machine has a problem in that direction change and cutting angle adjustment are difficult, whereby cutting performance is greatly deteriorated. In order to solve these problems, a floor cutting machine proposed by the present invention includes a cutting frame in addition to the main frame, and is configured such that the cutting blade is moved separately from the main frame. This will be described below.

Figure 2A:
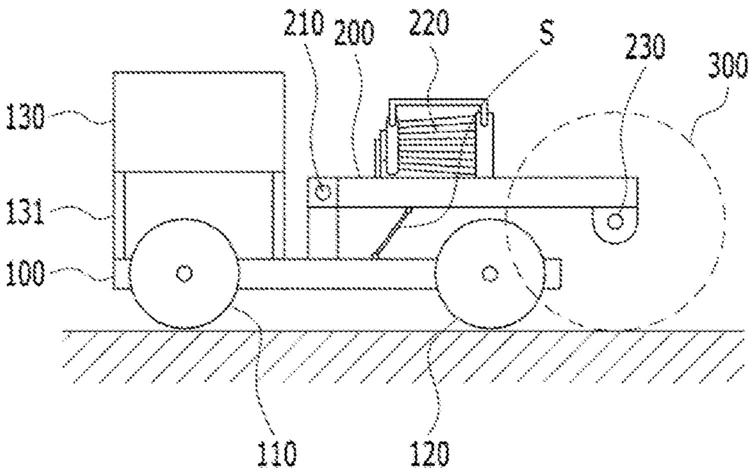
FIG. 2A and FIG. 2B are views showing a floor cutting machine according to an embodiment of the present invention.
Figure 2B:
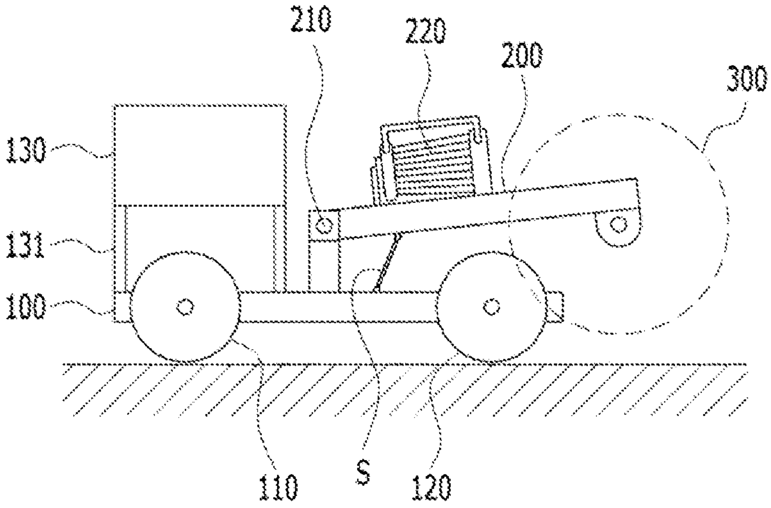

FIG. 2A and FIG. 2B are views showing a floor cutting machine according to an embodiment of the present invention. Specifically, FIG. 2A is a view showing the state in which a cutting blade is not moved upwards, and FIG. 2B is a view showing the state in which the cutting blade is moved upwards.

Figure 3:
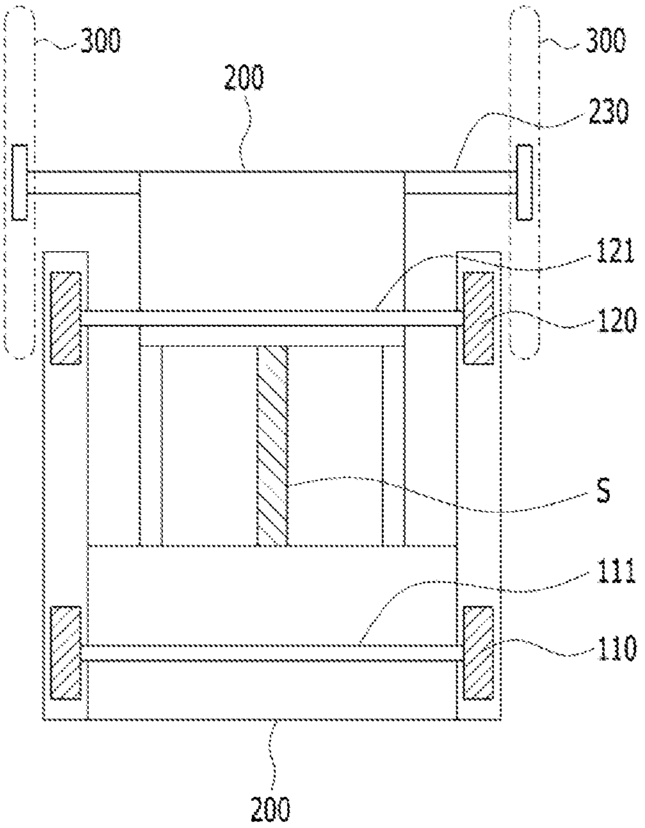
FIG. 3 is a view showing the floor cutting machine according to the embodiment of the present invention when viewed from below.

In addition, FIG. 3 is a view showing the floor cutting machine according to the embodiment of the present invention when viewed from below.

Hereinafter, the direction in which the floor cutting machine is moved forwards while cutting will be defined as a front and the opposite direction will be defined as a rear in order to assist in understanding the description.

Referring to FIG. 2A and FIG. 2B, the floor cutting machine may include a main frame 100, a cutting frame 200, a cutting blade 300, a rear wheel 110, a front wheel 120, a shielding cover 130, a pillar frame 131, a hinge portion 210, a power motor 220, a cutting shaft 230, and a first hydraulic cylinder S. Here, the term "first hydraulic cylinder S" is used for the sake of description. However, the present invention is not limited thereto, and various cylinders, such as an electric cylinder, may be used.

In general, the floor cutting machine straightly cuts a floor (e.g. concrete or rock). To this end, the floor cutting machine may include a power engine/motor and a speed reducer. The main frame 100 may support equipment necessary to cut the floor, such as the power engine/motor and the speed reducer. The equipment may be directly or indirectly located at an upper end of the main frame. As described above, the main frame 100 is a frame configured to support the floor cutting machine.

A plurality of (e.g. two) rear wheels 110 may be provided in the vicinity of the rear of the main frame 100 (e.g. opposite sides of the rear of the main frame), and a plurality of (e.g. two) front wheels 120 may be provided in the vicinity of the front of the main frame 100 (e.g. opposite sides of the front of the main frame). Here, the diameter of the front wheel 120 may be less than the diameter of the rear wheel 110.

Referring to FIG. 2A, FIG. 2B, and FIG. 3, the floor cutting machine 10 configured such that power is provided to the rear wheel 110 may be a four-wheel-drive system. In the present invention, the four-wheel-drive system may mean a system in which power from the engine is transmitted to four wheels or a system including four wheels.

Referring to FIG. 3, it can be seen that the two front wheels 120 are connected to each other via a front wheel shaft 121 and the two rear wheels 110 are connected to each other via a rear wheel shaft 111.

Next, the floor cutting machine according to the present invention may include the cutting frame 200. One side of the cutting frame 200 may be fixed to the vicinity of the rear of the main frame 100, and the other side of the cutting frame may be moved upwards and downwards.

In addition, the cutting shaft 230 may be located in the vicinity of the other side of the cutting frame 200, and cutting blade 300 may be fitted on opposite sides of the cutting shaft 230.

As can be seen from FIG. 2A and FIG. 2B, one side of the cutting frame 200 is hinged to the vicinity of the rear of the main frame 100 via the hinge portion 210. That is, in the state in which one side of the cutting frame 200 is fixed, the other side of the cutting frame is moved downwards (FIG. 2A) or upwards (FIG. 2B), and the cutting blade 300, which is located in the vicinity of the other side of the cutting frame, is also moved upwards and downwards.

A hydraulic cylinder S (hereinafter referred to as a first hydraulic cylinder so as to be distinguished from a hydraulic cylinder described below) may be provided as a power source necessary to move the cutting frame 200. The first hydraulic cylinder S may be connected to the main frame 100 and the cutting frame 200 therebetween to move the other side of the cutting frame 200 upwards and downwards.

That is, when the length of the first hydraulic cylinder S is increased by the movement of a piston thereof, the other side of the cutting frame 200 is moved upwards, and when the length of the first hydraulic cylinder is decreased, the other side of the cutting frame 200 is moved downwards. A worker may manipulate only the first hydraulic cylinder S in order to control upward and downward movement of the cutting blade 300.

Figure 4A:
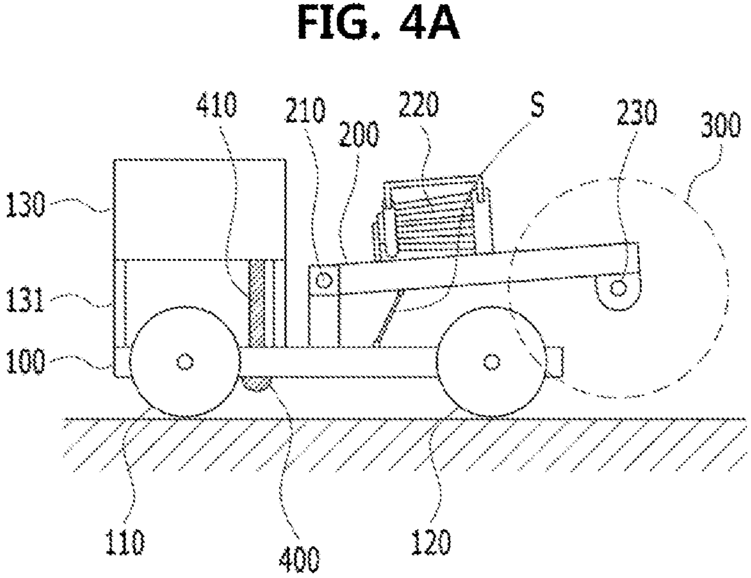
FIG. 4A and FIG. 4B are views showing an auxiliary wheel according to an embodiment of the present invention.
Figure 4B:
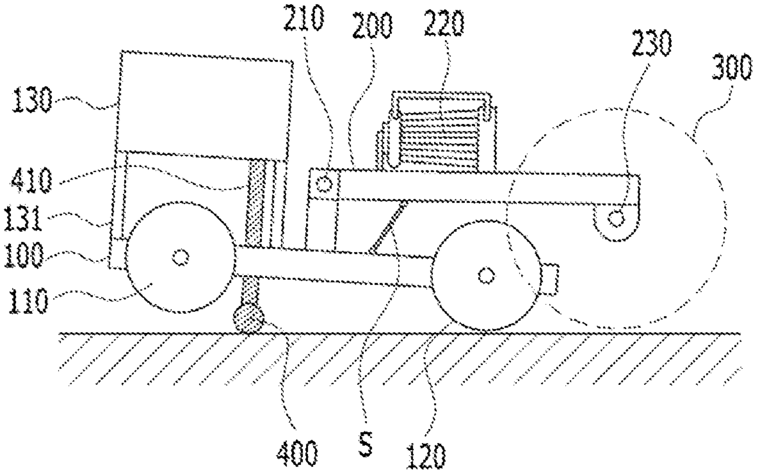

FIG. 4A and FIG. 4B are views showing an auxiliary wheel according to an embodiment of the present invention.

Referring to FIG. 4A and FIG. 4B, the floor cutting machine may further include an auxiliary wheel 400 and a second hydraulic cylinder 410, in addition to the main frame 100, the cutting frame 200, the cutting blade 300, the rear wheel 110, the front wheel 120, the shielding cover 130, the pillar frame 131, the hinge portion 210, the power motor 220, the cutting shaft 230, and the first hydraulic cylinder S. In the same manner, the term "second hydraulic cylinder 410" is used for the sake of description. However, the present invention is not limited thereto, and various cylinders, such as an electric cylinder, may be used.

FIG. 4A shows the state in which the auxiliary wheel 400 is moved upwards, and FIG. 4B shows the state in which the auxiliary wheel 400 is moved downwards.

First, the auxiliary wheel 400 is located farther forwards than the rear wheel 110. Specifically, the auxiliary wheel may be located between the front wheel 120 and the rear wheel 110 at a position closer to the rear wheel 110.

For reference, two auxiliary wheels 400 are included in the floor cutting machine, and the two auxiliary wheels 400 may be located ahead of the two rear wheels 110, respectively.

The auxiliary wheel 400 may be moved upwards and downwards by the second hydraulic cylinder 410, which is located at an upper end of the auxiliary wheel. That is, the worker may control the position of the auxiliary wheel 400 by manipulating the second hydraulic cylinder 410.

The second hydraulic cylinder 410 may be located between two pillar frames 131 (configured to support the shielding cover 130), a description of which will follow. Specifically, the second hydraulic cylinder may be located immediately behind a front-side pillar frame, which is one of the two pillar frames 131.

When the auxiliary wheel 400 is located above, the auxiliary wheel 400 does not contact the floor, and the floor cutting machine 10 is supported on the floor through the two front wheels 120 and the two rear wheels 110, whereby the floor cutting machine is operated in a four-wheel-drive mode.

When the auxiliary wheel 400 is located below, the two rear wheels 110 do not contact the floor, and the floor cutting machine is supported on the floor through the two front wheels 120 and the two auxiliary wheels 400, whereby the floor cutting machine is also operated in a four-wheel-drive mode. That is, the auxiliary wheel 400 can replace the rear wheel 110.

The reason that the auxiliary wheel 400 can replace the rear wheel 110, as described above, is that the auxiliary wheel 400 is rotatable, unlike the rear wheel 110, whereby it is possible to adjust the direction of the auxiliary wheel.

That is, the worker may move the auxiliary wheel 400 downwards using the second hydraulic cylinder 410, and may rotate the auxiliary wheel 400 in order to operate the floor cutting machine 10.

Meanwhile, although not concretely shown in the drawings, the section of the cutting blade 300 according to the present invention may have a circular shape, and recesses configured to cut the floor may be provided in an outer circumference of the circular shape at regular intervals. The shape of each recess may be changed depending on circumstances. In most cases, the recess may have a quadrangular shape.

The cutting frame 200 according to the present invention may include a power motor 220 and a speed reducer (not shown) provided at an upper end thereof. The power motor 220 and the speed reducer, which are equipment configured to support movement of the floor cutting machine 10, may be controlled by the worker or a wireless controller.

In addition, a plurality of pillar frames 131 connected to the main frame 100 is located at a rear side of the floor cutting machine, and the pillar frames may support the shielding cover 130. For reference, the shielding cover 130 may protect the power motor 220 and the speed reducer.

Figure 5:
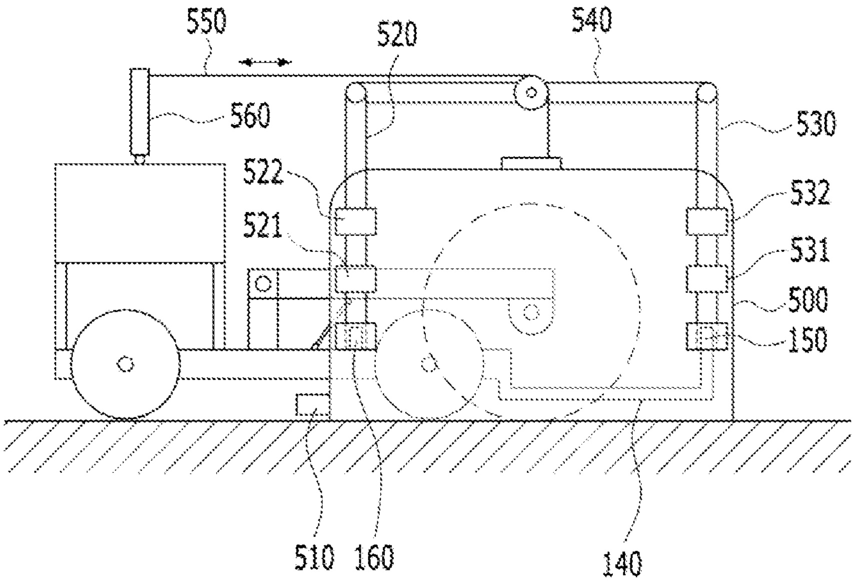
FIG. 5 is a view showing a floor cutting machine to which a dust collection cover according to another embodiment of the present invention is coupled.
Figure 6:
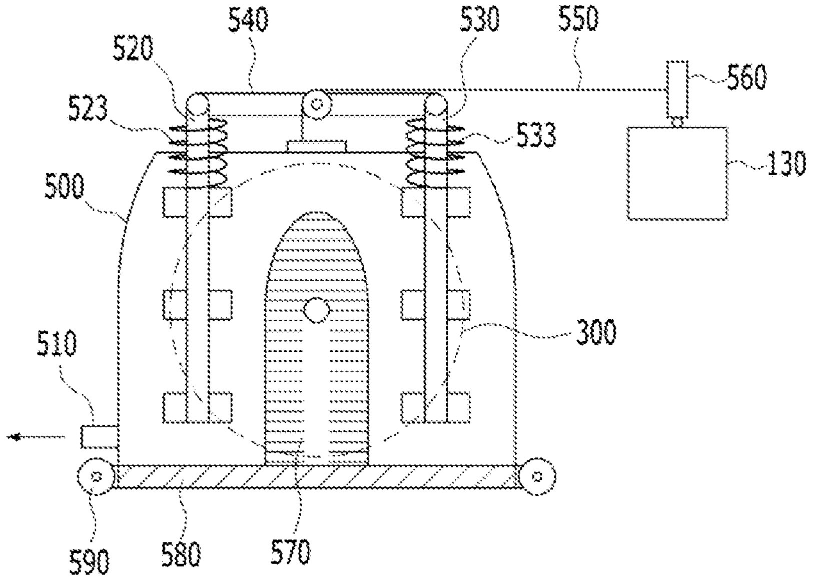
FIG. 6 is a view concretely showing the dust collection cover according to the other embodiment of the present invention.

FIG. 5 is a view showing a floor cutting machine to which a dust collection cover according to another embodiment of the present invention is coupled. FIG. 6 is a view concretely showing the dust collection cover according to the other embodiment of the present invention.

As can be seen from FIG. 5, the floor cutting machine may further include a front frame 140 located at a front side of the main frame 100. The front frame 140 may be detachably attached to the main frame 100 by bolt coupling.

In addition, the floor cutting machine may further include a second dust collection cover fixing pin 150 located in front of the front frame 140 in order to attach a dust collection cover 500. The floor cutting machine may further include a first dust collection cover fixing pin 160 located at the main frame 100 so as to be adjacent to the rear of the front wheel 110.

The first dust collection cover fixing pin 160 and the second dust collection cover fixing pin 150 are pins for coupling the dust collection cover 500 according to the present invention.

Specifically, a first pillar 520, a second pillar 530, and a third pillar 540 may be provided as elements that connect the dust collection cover 500 to the floor cutting machine. The first dust collection cover fixing pin 160 may be inserted into the first pillar 520 so as to be connected thereto, and the second dust collection cover fixing pin 150 may be inserted into the second pillar 530 so as to be connected thereto.

That is, a recess may be formed in a lower end of each of the first pillar 520 and the second pillar 530, and the first dust collection cover fixing pin 160 and the second dust collection cover fixing pin 150 may be inserted into the respective recesses.

Consequently, it is possible to easily connect (install) the dust collection cover 500 to (at) the floor cutting machine and to easily detach the dust collection cover from the floor cutting machine.

In addition, the third pillar 540 may connect upper ends of the first pillar 520 and the second pillar 530 to each other, whereby the first pillar 520, the second pillar 530, and the third pillar 540 may be disposed in the form of "[".

Meanwhile, movement of the dust collection cover 500 according to the present invention is manipulated by a wire 550 connected and fixed to an upper end thereof, and a wire manipulation unit is provided as a part configured to support manipulation of the wire 550.

The wire manipulation unit may include a controller, such as an operation lever 560. In addition, the wire manipulation unit may manipulate movement of the wire 550 using a hydraulic cylinder. For reference, the wire manipulation unit may be located in the vicinity of the shielding cover 130.

One side of the wire 550 may be fixed to the upper end of the dust collection cover 500, the wire may extend over a roller located at a middle part of the third pillar 540, and the other side of the wire may be fixed to the wire manipulation unit.

That is, the wire 550 is an element that connects the wire manipulation unit and the dust collection cover 500 therebetween. Movement of the wire 550 may be manipulated by the wire manipulation unit, and the dust collection cover 500, fixed to one side of the wire 550, may also be moved upwards and downwards. Since the dust collection cover 500 can be moved upwards and downwards by the wire manipulation unit, it is possible for the worker to easily recognize the position of the cutting blade or the position to be cut, whereby worker's cutting speed may be remarkably increased.

Meanwhile, the dust collection cover 500, the first pillar 520, and the second pillar 530 may be connected to each other as follows.

First, the dust collection cover 500 may be provided with a plurality of fixing recesses, and the plurality of fixing recesses may include a first fixing recess 521, a second fixing recess 522, a third fixing recess 531, and a fourth fixing recess 532. Here, each of the fixing recesses may have a through-hole vertically formed therethrough such that a corresponding one of the pillars can be inserted thereinto. One surface of the fixing recess is attached and fixed to the dust collection cover 500.

The first pillar 520 may be inserted into the first fixing recess 521, located at a lower end thereof, and the second fixing recess 522, located an upper end thereof, so as to be connected to the dust collection cover 500. The second pillar 530 may be inserted into the third fixing recess 531, located at a lower end thereof, and the fourth fixing recess 532, located an upper end thereof, so as to be connected to the dust collection cover 500.

At this time, a first spring 523 may be provided on the first pillar 520 between the second fixing recess 522 and the third pillar 540, and a second spring 533 may be provided on the second pillar 530 between the fourth fixing recess 532 and the third pillar 540.

The first spring 523 and the second spring 533 may apply elastic force to the dust collection cover 500 in a direction toward the floor, whereby the dust collection cover 500 may be easily brought into contact with the floor.

The dust collection cover 500 according to the present invention serves to wrap the cutting blade 300 of the floor cutting machine and to collect dust, water, and sludge generated during operation of the cutting blade 300 (dust collection effect). In addition, the dust collection cover may remove noise generated during work (soundproof effect).

In order to achieve the dust collection effect and the soundproof effect, the dust collection cover 500 includes the following elements.

First, a rubber cover 580 made of a rubber material is attached to a lower end of the dust collection cover 500, and the rubber cover 580 serves to collect waste (e.g. dust) generated during operation of the cutting blade 300 so as not to be discharged to the outside. The rubber cover 580 made of the rubber material is very useful to collect water, sludge, etc. so as not to leak to the floor.

In addition, a dust collection port 510 may be provided at a rear of the lower end of the dust collection cover 500 to discharge waste collected by the rubber cover 580 in one place. In an embodiment, waste collected by external power may be discharged through the dust collection port 510.

In addition, a wheel 590 may be provided at each of a front and the rear of the lower end of the dust collection cover 500 such that the dust collection cover 500 can be easily moved even during work. The wheel 590 is attached to a lower end of an outside of the dust collection cover 500. Two wheels may be provided at each of a left side and a right side of the dust collection cover, and therefore a total of four wheels 590 may be provided.

For reference, during operation of the cutting blade 300, the rubber cover 580 may be brought into tight contact with the floor, whereby the dust collection effect and the soundproof effect may be maximized.

In an embodiment, the wheel 590 may be located higher (by about 5 mm) than the rubber cover 580 during work, whereby the dust collection effect and the soundproof effect of the rubber cover 580 may not be impeded. When the floor cutting machine is moved, the dust collection cover 500 may be moved upwards such that the wheel 590 is moved downwards.

In another embodiment, the wheel 590 may be located lower than the rubber cover 580 during work in the state in which there is little gap between the rubber cover 580 and the floor, whereby the dust collection effect and the soundproof effect may be achieved.

Meanwhile, a hole 570 may be formed in the dust collection cover 500 so as to extend from the center to the lower end thereof, and a central part of the cutting blade 300 may be moved upwards and downwards in the hole 570. That is, the worker may check the movement of the cutting blade 300 in the hole 570.

In addition, a plurality of brushes may be provided in the hole 570 (the brushes may be attached to left and right sides of the hole) so as to cover the hole such that waste generated by the cutting blade is not discharged to the outside. The brushes may be made of a flexible material, such as rubber, and may have a bendable structure.

In the present invention, only the cutting frame 200 may be moved upwards and downwards in the state in which the main frame 100 is fixed, and therefore the cutting blade 300 fixed to the cutting frame 200 may be moved upwards and downwards.

In addition, the dust collection cover 500 according to the present invention may be moved separately from the main frame 100, unlike an existing dust collection cover, and may be moved upwards and downwards by a separate manipulation unit.

Since the main frame 100 and the cutting blade 300 are moved separately from each other and the dust collection cover 500 is moved separately therefrom, as described above, it is possible for the worker to effectively collect dust generated during work and to eliminate noise.

If the dust collection cover always covers the cutting blade, it is difficult to find the position to be cut or the position of the cutting blade. In contrast, according to the present invention, it is possible for the worker to move the dust collection cover 500 upwards even in the state in which the cutting blade 300 is located below in order to accurately locate the cutting blade at the position to be cut while looking thereat with the naked eye.

Meanwhile, although not shown, a cutting stop frame configured to stop the cutting shaft 230 through a simple structure may be provided.

The cutting stop frame may be provided at an upper side of the cutting frame 200, and one side of the cutting stop frame may be hinged to the cutting frame 200 such that the cutting stop frame can be moved upwards and downwards. For reference, the other side of the cutting stop frame is not connected to the cutting frame 200, and the cutting shaft 230 may be located under the other side of the cutting stop frame. In addition, the power engine 220 and the speed reducer may be located at an upper side of the cutting stop frame.

When the cutting stop frame is moved downwards, pressure is applied to the cutting shaft 230 attached to the cutting frame 200 due to the power engine 220, the speed reducer, and the weight of the cutting stop frame. That is, force is applied downwards to the cutting shaft due to the weight of the cutting stop frame, whereby the cutting blade 300 is not operated, and therefore cutting is stopped.

That is, the worker may move only the cutting stop frame to stop the operation of the cutting blade 300, thereby stopping the cutting work.

Figure 7:
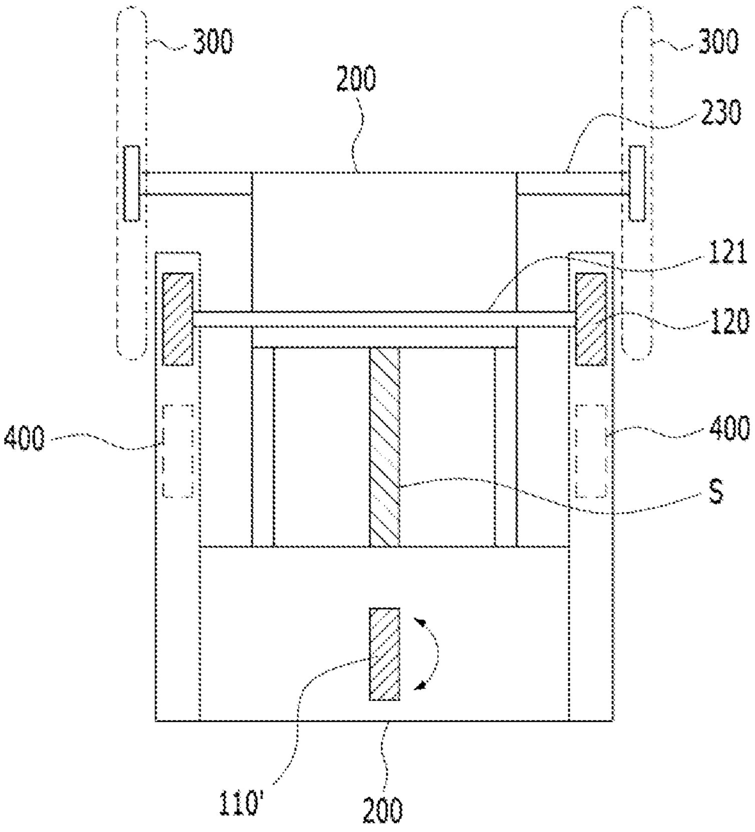
FIG. 7 is a view showing a three-wheeled floor cutting machine according to a further embodiment of the present invention.

FIG. 7 is a view showing a three-wheeled floor cutting machine according to a further embodiment of the present invention.

The floor cutting machine according to the embodiment of the present invention shown in FIG. 2A and FIG. 2B, etc. is a four-wheeled floor cutting machine having four wheels. Referring to FIG. 7, two rear wheels 110 are not provided at opposite sides of the rear of the main frame 100, but one rear wheel 110' may be provided at a middle of the rear of the main frame 100.

Consequently, the three-wheeled floor cutting machine may be configured to have a structure including two front wheels 120 and one rear wheel 110'.

The floor cutting machine shown in FIG. 7 has an advantage in that the rear wheel 110' is rotatable, whereby it is possible to adjust the direction in which the floor cutting machine 10 is moved forwards. In existing floor cutting machines, direction adjustment is not possible, and most of the floor cutting machines are configured to be moved in a state of being held by workers. Rotation of the rear wheel 110' of the floor cutting machine shown in FIG. 7 may be manipulated by the worker. That is, the worker may adjust the rotation and direction of the rear wheel 110' using a controller or a remote controller in order to manipulate movement of the floor cutting machine. The direction of the rear wheel 110' may be adjusted by a direction adjustment cylinder (not shown) connected to the rear wheel 110'. The direction adjustment cylinder (not shown) may be a hydraulic direction adjustment cylinder or a motor hydraulic direction adjustment cylinder.

The direction change of the three-wheeled floor cutting machine may be easily performed, and therefore the three-wheeled floor cutting machine may perform 360-degree rotation. Consequently, the three-wheeled floor cutting machine may perform circular cutting.

Meanwhile, the three-wheeled floor cutting machine may include auxiliary wheels 400 provided at opposite sides thereof in front of the rear wheel 110', and the auxiliary wheels 400 may be moved upwards and downwards by second hydraulic cylinders 410 located at upper ends thereof.

When the auxiliary wheels 400 are located above, the floor cutting machine is supported on the floor through the two front wheels 120 and the one rear wheel 110', whereby the floor cutting machine is operated in a three-wheel-drive mode. When the auxiliary wheels 400 are located below, the rear wheel 110' does not contact the floor, and the floor cutting machine is supported on the floor through the two front wheels 120 and the two auxiliary wheels 400, whereby the floor cutting machine is operated in a four-wheel-drive mode.

For reference, the three-wheeled floor cutting machine is different in only the number of wheels from the four-wheeled floor cutting machine, and therefore the above description of the four-wheeled floor cutting machine may be equally applied to the three-wheeled floor cutting machine.

Figure 8A:
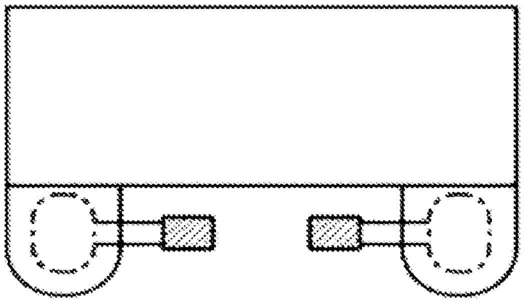
FIG. 8A and FIG. 8B are views showing a power motor (hydraulic/electric motor) installed in the floor cutting machine according to the present invention.
Figure 8B:
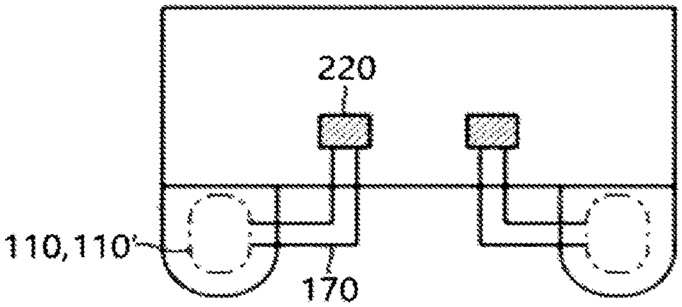

FIG. 8A and FIG. 8B are views showing the power motor (hydraulic/electric motor) installed in the floor cutting machine according to the present invention.

FIG. 8A shows that the power motors (hydraulic motors or electric motors) 220 are directly connected to power wheels, and FIG. 8B shows that vertical speed reducers 170 are disposed between the power motors 220 and the power wheels, respectively.

When the floor cutting machine according to the present invention is a four-wheeled floor cutting machine, the power wheels may be the rear wheels 110. When the floor cutting machine according to the present invention is a three-wheeled floor cutting machine, the power wheel may be the rear wheel 110'.

Driving force may be applied to the power wheel 110 or 110' by the power motor 220. For example, when the power motor 220 rotates one turn in the state in which the diameter of the power wheel 110 or 110' is about 15 cm, the power wheel 110 or 110' is rotated one turn. In this case, the floor cutting machine is moved about 50 cm (3.14×15).

In order for the floor cutting machine to cut iron reinforcing rods or concrete, the power motor 220 must be driven at a high speed; however, the floor cutting machine must be moved very slowly. In many cases, the floor cutting machine must not be moved 20 cm or more per minute. If the power motor 220 is directly connected to the power wheel 110 or 110', therefore, accuracy and safety of the floor cutting machine may be reduced. Furthermore, the power motor 220 must rotate at least 15 to 20 turns per minute in order to generate effective power. If the power motor is directly connected to the power wheel, as shown in FIG. 8A, therefore, a problem may occur.

Particularly, in the conventional floor cutting machine, when the power motor 220 is driven and the floor cutting machine seems to be excessively moved forwards, the worker manually controls movement of the floor cutting machine. In this case, much effort of the worker is required, and accuracy control is not possible. In the floor cutting machine according to the present invention, the speed reducer 170 is connected to the power motor 220 and the power wheel 110 or 110' therebetween. In the floor cutting machine according to the present invention, a wireless controller (e.g. a wireless remote controller) is provided to wirelessly control the power motor 220 and the speed reducer 170, whereby it is possible to accurately control the cutting work.

That is, in the floor cutting machine according to the present invention, the power motor 220 and the power wheel 110 or 110' are connected to each other via the speed reducer 170. Control may be performed such that the floor cutting machine is slowly moved forwards to cut the floor while the power motor 220 is driven at a high speed (or at a high output) through control of the speed reducer 170. For example, when the speed reducer 170 is set to have a reduction ratio of 30:1, the power wheel 110 or 110' is rotated one turn when the power motor 220 rotates 30 turns, and therefore it is possible to accurately control movement of the floor cutting machine.

In addition, when the floor cutting machine according to the present invention performs floor cutting work on a ramp, the floor cutting work on the ramp may be easily performed using the speed reducer 170. Since the power motor 220 has no brake function, the floor cutting machine moves downwards along the ramp even though the power motor 220 is not driven. When the speed reducer 170 is provided, however, the speed reducer 170 performs the brake function, whereby the floor cutting machine is controlled, and therefore the work on the ramp may be easily performed. Consequently, it is possible to accurately control the floor cutting work. In particular, for the three-wheeled floor cutting machine, the power wheel 110' is rotatable, whereby direction control is also possible. When the speed reducer 170 is also provided, therefore, it is possible to accurately adjust the direction and the forward movement speed of the floor cutting machine.

Most current floor cutting machines are four-wheeled floor cutting machines. When the three-wheeled floor cutting machine 10 is used, direction change in a narrow space is easily performed, and more rapid direction change is possible.

The elements described above are denoted by the following reference symbols.

100: main frame, 110: rear wheel, 120: front wheel, 130: shielding cover, 131: pillar frame, 140: front frame, 150: second dust collection cover fixing pin, 160: first dust collection cover fixing pin, 170: speed reducer, 200: cutting frame, 210: hinge portion, 220: power motor, 230: cutting shaft, S: first hydraulic cylinder, 300: cutting blade, 400: auxiliary wheel, 410: second hydraulic cylinder, 500: dust collection cover, 510: dust collection port, 520: first pillar, 530: second pillar, 540: third pillar, 550: wire, 560: operation lever, 570: hole, 580: rubber cover, and 590: wheel.

The embodiments as described above are combinations of elements and features of the present invention. The elements or features may be considered selective unless mentioned otherwise. Each element or feature may be practiced without being combined with other elements or features. In addition, an embodiment of the present invention may be constructed by combining some of the elements and/or features. Operation orders described in the embodiments of the present invention may be changed. Some elements or features of any one embodiment may be included in another embodiment or may be replaced with corresponding elements or features of another embodiment. It is obvious to those skilled in the art that claims that are not explicitly cited in each other in the appended claims may be presented in combination as an embodiment of the present invention or included as a new claim by subsequent amendment after the application is filed.

It will be apparent to those skilled in the art that the present invention may be embodied in specific forms other than those set forth herein without departing from the spirit and essential characteristics of the present invention. Therefore, the above detailed description should be construed in all aspects as illustrative and not restrictive. The scope of the present invention should be determined by reasonable interpretation of the accompanying claims, and all modifications within an equivalent scope of the present invention are included in the scope of the present invention.

INDUSTRIAL APPLICABILITY

A floor cutting machine according to the present invention is industrially applicable to cutting during road construction, dismantling of a structure, such as concrete, etc.

The invention claimed is:

1. A floor cutting machine comprising:

a dust collection cover;

a main frame configured to support equipment for cutting a floor, the main frame having a first dust collection cover fixing pin configured to attach the dust collection cover to the floor cutting machine;

a plurality of front wheels located at opposite sides of a front of the main frame;

at least one rear wheel located at a rear of the main frame;

an auxiliary wheel located farther forwards than the at least one rear wheel, the auxiliary wheel being rotatable to adjust a direction of the auxiliary wheel;

a cutting frame, which is a frame separate from the main frame, a first side of the cutting frame being fixed to a vicinity of the rear of the main frame and a second side of the cutting frame being configured to be moved upwards and downwards;

a cutting blade fitted on a cutting shaft located in a vicinity of the second side of the cutting frame;

a front frame detachably connected to the front of the main frame, the front frame having a second dust collection cover fixing pin configured to attach the dust collection cover to the floor cutting machine;

a first pillar configured to allow the first dust collection cover fixing pin to be inserted thereinto so as to be connected thereto, a second pillar configured to allow the second dust collection cover fixing pin to be inserted thereinto so as to be connected thereto, and a third pillar configured to connect upper ends of the first pillar and the second pillar; and an operation lever configured to manipulate movement of a wire, wherein the dust collection cover is coupled to the floor cutting machine using the first dust collection cover fixing pin and the second dust collection cover fixing pin, wherein the dust collection cover is connected to the first pillar and the second pillar, wherein the dust collection cover is fixed to one side of the wire and can be moved upwards and downwards, wherein the auxiliary wheel is moved upwards and downwards by a first hydraulic cylinder located at an upper end thereof, wherein when the auxiliary wheel is located upwards, the floor cutting machine is supported on the floor through the plurality of front wheels and a plurality of rear wheels, whereby the floor cutting machine is operated in a four-wheel-drive mode, and wherein when the auxiliary wheel is located downwards, the at least one rear wheel does not contact the floor, and the floor cutting machine is supported on the floor through the plurality of front wheels and a plurality of auxiliary wheels, whereby the floor cutting machine is also operated in a four-wheel-drive mode.

2. The floor cutting machine according to claim 1, wherein the first side of the cutting frame is hinged to the vicinity of the rear of the main frame, and the floor cutting machine further comprises a second hydraulic cylinder connected to the main frame and the cutting frame, the second hydraulic cylinder being configured to move the second side of the cutting frame upwards and downwards.

3. The floor cutting machine according to claim 2, wherein the second hydraulic cylinder is configured to be manipulated by a worker to move the second side of the cutting frame upwards and downwards and to move the cutting blade located in the vicinity of the second side of the cutting frame upwards and downwards.

4. The floor cutting machine according to claim 1, further comprising:

a power motor configured to provide power to the floor cutting machine; and a speed reducer connected to the power motor and the at least one rear wheel, the speed reducer being configured to control a forward movement of the floor cutting machine.

5. The floor cutting machine according to claim 4, further comprising a wireless controller configured to wirelessly control the power motor and the speed reducer.

6. The floor cutting machine according to claim 1, further comprising:

a power motor and a speed reducer located at an upper end of the cutting frame, wherein a shielding cover is supported by a plurality of pillar frames connected to the main frame, and the shielding cover is configured to protect the power motor and the speed reducer.

7. The floor cutting machine according to claim 1, wherein a section of the cutting blade has a circular shape, and recesses configured to cut the floor are provided in an outer circumference of the circular shape at regular intervals.

* * * * *